(12) United States Patent
Leng et al.

(10) Patent No.: US 12,132,547 B2
(45) Date of Patent: Oct. 29, 2024

(54) METHOD AND APPARATUS FOR USER SELECTION IN DISTRIBUTED MIMO

(71) Applicant: Samsung Electronics Co., Ltd., Suwon-si (KR)

(72) Inventors: Shiyang Leng, Allen, TX (US); Ahmed Atef Ibrahim Ibrahim, Plano, TX (US); Hao Chen, Plano, TX (US); Rebal Al Jurdi, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 17/506,547

(22) Filed: Oct. 20, 2021

(65) Prior Publication Data

US 2022/0376758 A1 Nov. 24, 2022

Related U.S. Application Data

(60) Provisional application No. 63/192,378, filed on May 24, 2021.

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04L 5/0048* (2013.01); *H04W 72/23* (2023.01)

(58) Field of Classification Search
CPC ....... H04B 7/0491–0634; H04B 7/0404–0473; H04B 7/0613–0636;
(Continued)

(56) References Cited

U.S. PATENT DOCUMENTS 9,504,022 B2 11/2016 Liu et al.
9,954,589 B2 4/2018 Liu et al.
(Continued)

FOREIGN PATENT DOCUMENTS

CN 106788645 B 6/2020
WO 2020092468 A1 5/2020

OTHER PUBLICATIONS

International Search Report and Written Opinion issued May 3, 2022 regarding Application No. PCT/KR2022/001875, 6 pages.
(Continued)

*Primary Examiner* — Michael Thier
*Assistant Examiner* — Prince A Mensah

(57) ABSTRACT

A system and method for user selection in distributed multiple-input, multiple-output (MIMO). The system performs a method that includes configuring a first channel state information-reference signal (CSI-RS) resource set for a serving transmission point (TRP) and a second CSI-RS resource for a concatenated channel, wherein the concatenated channel is between a virtual panel and the apparatus, the virtual panel comprising distributed panels from a serving TRP and a helping TRP. The method also includes computing a metric as a function of one or more quantities included in one or more measurement reports, received from a user equipment (UE), for the concatenated channel and at least one of the serving TRP channel or the helping TRP channel. The method also includes configuring, based on the metric, the UE for one of: a legacy transmission or a distributed MIMO transmission.

20 Claims, 10 Drawing Sheets

(51) Int. Cl.
*H04L 5/00* (2006.01)
*H04W 72/23* (2023.01)

(58) Field of Classification Search
CPC ..... H04L 5/0048; H04L 5/005; H04L 5/0051; H04L 5/0053; H04W 24/08; H04W 24/10; H04W 36/085; H04W 72/23
See application file for complete search history.

(56) References Cited

U.S. PATENT DOCUMENTS

| | | | |
|---|---|---|---|
| 10,680,682 B2 | 6/2020 | Fakoorian et al. | |
| 10,840,991 B2 | 11/2020 | Kakishima et al. | |
| 2015/0215856 A1 | 7/2015 | Kim et al. | |
| 2017/0141832 A1* | 5/2017 | Ji | H04L 5/0094 |
| 2017/0373737 A1 | 12/2017 | Liang et al. | |
| 2019/0238287 A1 | 8/2019 | Zhou et al. | |
| 2023/0292167 A1* | 9/2023 | Su | H04W 24/10 |
| 2023/0328569 A1* | 10/2023 | Khoshnevisan | H04B 7/0639 370/252 |

OTHER PUBLICATIONS

Huawei et al., "Discussion Summary for CSI enhancements MTRP and FR1 FDD reciprocity", 3GPP TSG RAN WG1 Meeting #102-e, R1-2006973, Aug. 2020, 35 pages.

NTT Docomo, Inc., "Work plan for Rel-15 NR WI", 3GPP TSG RAN WG1 Meeting #90bis, R1-1718177, Oct. 2017, 176 pages.

"5G; NR; Radio Resource Control (RRC) Protocol specification (3GPP TS 38.331 version 16.1.0 Release 16)", ETSI TS 138 331 V16.1.0, Jul. 2020, 886 pages.

* cited by examiner

METHOD AND APPARATUS FOR USER SELECTION IN DISTRIBUTED MIMO

CROSS-REFERENCE TO RELATED APPLICATIONS AND CLAIM OF PRIORITY

The present application claims priority to U.S. Provisional Patent Application No. 63/192,378, filed on May 24, 2021. The contents of the above-identified patent document is incorporated herein by reference.

TECHNICAL FIELD

The present disclosure relates generally to wireless communication systems and, more specifically, the present disclosure relates to user selection in distributed multiple-input, multiple-output (MIMO).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

The 5G communication system is considered to be implemented to include higher frequency (mmWave) bands, such as 28 gigahertz (GHz) or 60 GHz bands or, in general, above 6 GHz bands, so as to accomplish higher data rates, or in lower frequency bands, such as below 6 GHz, to enable robust coverage and mobility support. In March 2019, the Federal Communications Commission (FCC) opened the spectrum between 95 GHz and 3,000 GHz for experimental use and unlicensed applications, to encourage the development of new wireless communication technologies. Additionally, discussions on use cases and deployment scenarios for 5G NR systems operating beyond 52.6 GHz bands also have begun. Support for operation in these bandwidths will be included in 3GPP Release 16. It is inevitable that telecommunications will utilize the terahertz (THz) bands for future wireless systems. The THz band is typically defined as the bandwidth ranging from 0.1 THz to 10 THz. A total of 102 GHz spectrum in the range between 95 GHz and 300 GHz is also being made accessible for licensed fixed point-to-point and mobile services through the Spectrum Horizon program. Accordingly, the extremely wideband THz channels with tens of GHz-wide bandwidth could potentially support the Terabits per second (Tbps) communication as required by the future 6G standards.

To realize stable THz communications in practice is not straight forward, and a handful of fundamental and technical challenges need to be overcome. Commonly, this band is often referred to as the terahertz gap, that is mainly due to the lack of efficient devices, which generate and detect signals in these frequencies. In this band the device dimensions are significant relative to the signal wavelength, and this results in high losses by dielectric loss and skin-depth, surface roughness losses. Also devices show low efficiency by significant impact of parasitics of the device. The severe path-loss and atmospheric absorption add to the challenge of utilizing this band.

SUMMARY

The present disclosure relates to wireless communication systems and, more specifically, the present disclosure relates to user selection in distributed multiple-input, multiple-output (MIMO).

In one embodiment, an apparatus is provided. The apparatus includes a transceiver configured to communicate via a wired or wireless communication medium. The apparatus also includes a processor coupled to the transceiver. The processor is configured to: configure a first channel state information-reference signal (CSI-RS) resource set for a serving transmission point (TRP) and a second CSI-RS resource for a concatenated channel, wherein the concatenated channel is between a virtual panel and the apparatus, the virtual panel comprising distributed panels from a serving TRP and a helping TRP; computes a metric as a function of one or more quantities included in one or more measurement reports, received from a user equipment (UE), for the concatenated channel and at least one of the serving TRP channel or the helping TRP channel; and configure, based on the metric, the UE for one of: a legacy transmission or a distributed multiple input multiple output (MIMO) transmission.

In another embodiment, a method is provided. The method includes configuring a first channel state information-reference signal (CSI-RS) resource set for a serving transmission point (TRP) and a second CSI-RS resource for a concatenated channel, wherein the concatenated channel is between a virtual panel and the apparatus, the virtual panel comprising distributed panels from a serving TRP and a helping TRP. The method also includes computing a metric as a function of one or more quantities included in one or more measurement reports, received from a user equipment (UE), for the concatenated channel and at least one of the serving TRP channel or the helping TRP channel. The method also includes configuring, based on the metric, the UE for one of: a legacy transmission or a distributed multiple input multiple output (MIMO) transmission.

In yet another embodiment, a non-transitory computer readable medium is provided. The non-transitory computer readable medium a plurality of instructions that, when executed by at least one processor, cause the at least one processor to configure a first channel state information-reference signal (CSI-RS) resource set for a serving transmission point (TRP) and a second CSI-RS resource for a concatenated channel, wherein the concatenated channel is between a virtual panel and the apparatus, the virtual panel comprising distributed panels from a serving TRP and a helping TRP; compute a metric as a function of one or more quantities included in one or more measurement reports, received from a user equipment (UE), for the concatenated channel and at least one of the serving TRP channel or the helping TRP channel; and configure, based on the metric, the UE for one of: a legacy transmission or a distributed multiple input multiple output (MIMO) transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
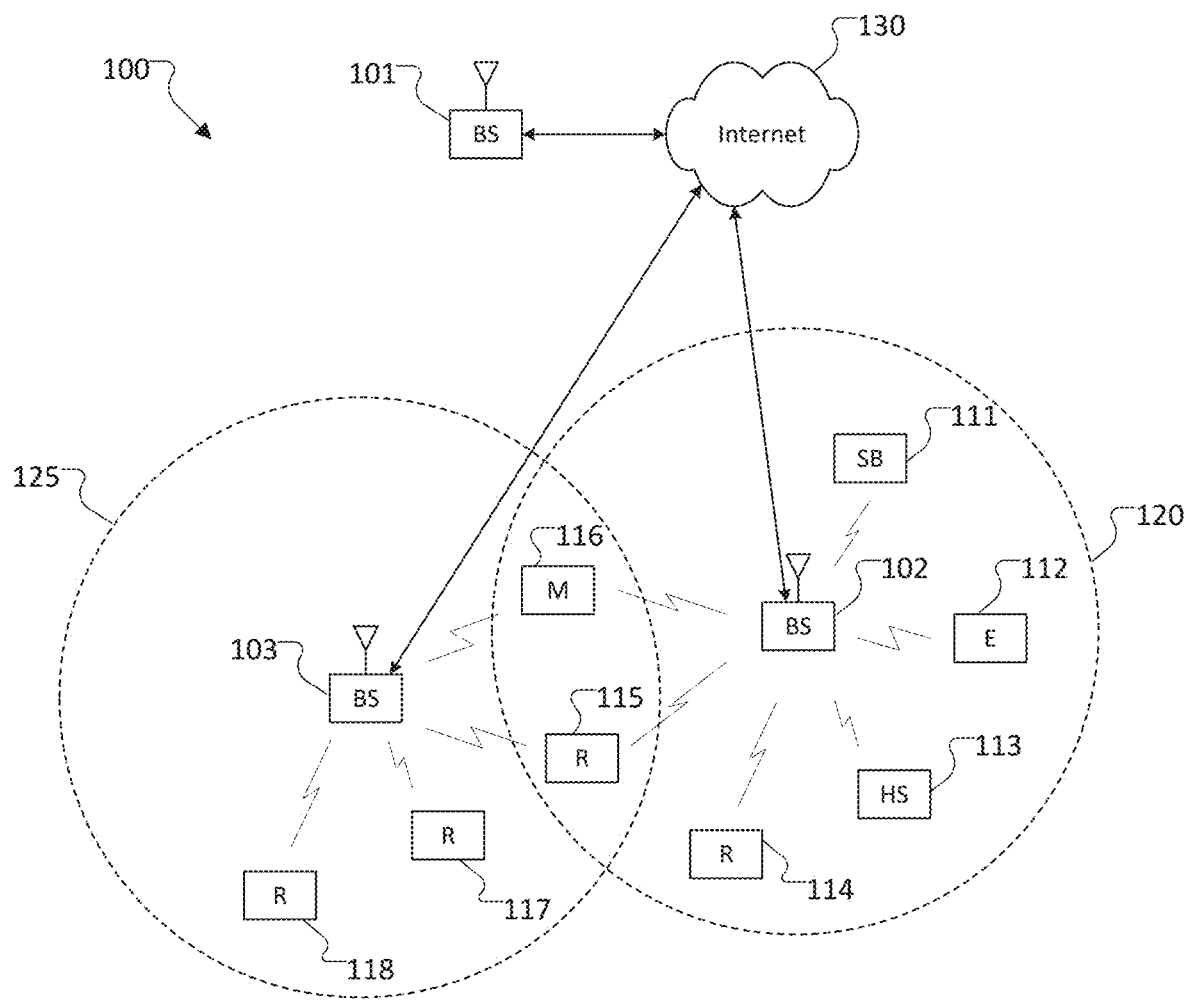
FIG. 1 illustrates an example wireless network according to embodiments of the present disclosure.

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of fourth generation (4G) communication systems, and to enable various vertical applications, fifth generation (5G) communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In CoMP transmission, when distributed MIMO is applied under limited CSI feedback, performance degradation may occur since beamforming based on insufficient or inaccurate CSI cannot incorporate the effects caused by channel discrepancy from multiple TRPs, such as power imbalance, phase difference, and the like. Users suffering these issues may not be beneficiary of distributed MIMO transmissions with limited feedback. User selection methods should be designed for distributed MIMO.

Embodiments of the present disclosure provide systems and methods for user selection in distributed MIMO that enable distributed MIMO transmission to selected users and allow legacy transmission to unselected users to avoid potential performance degradation for users in unfavorable condition of using distributed MIMO. Specifically, user selection is determined based on one or multiple CSI measurements for single TRP channel and/or multi-TRP channel, various long-term and short-term features that characterize CSI are exploited in the selection algorithms, user selection decision can be updated dynamically based on the periodicity of CSI reports.

The following documents are hereby incorporated by reference into the present disclosure as if fully set forth herein: 3GPP, TS 38.331 v16.1.0, Radio Resource Control (RRC); Protocol specification.

Figure 2:
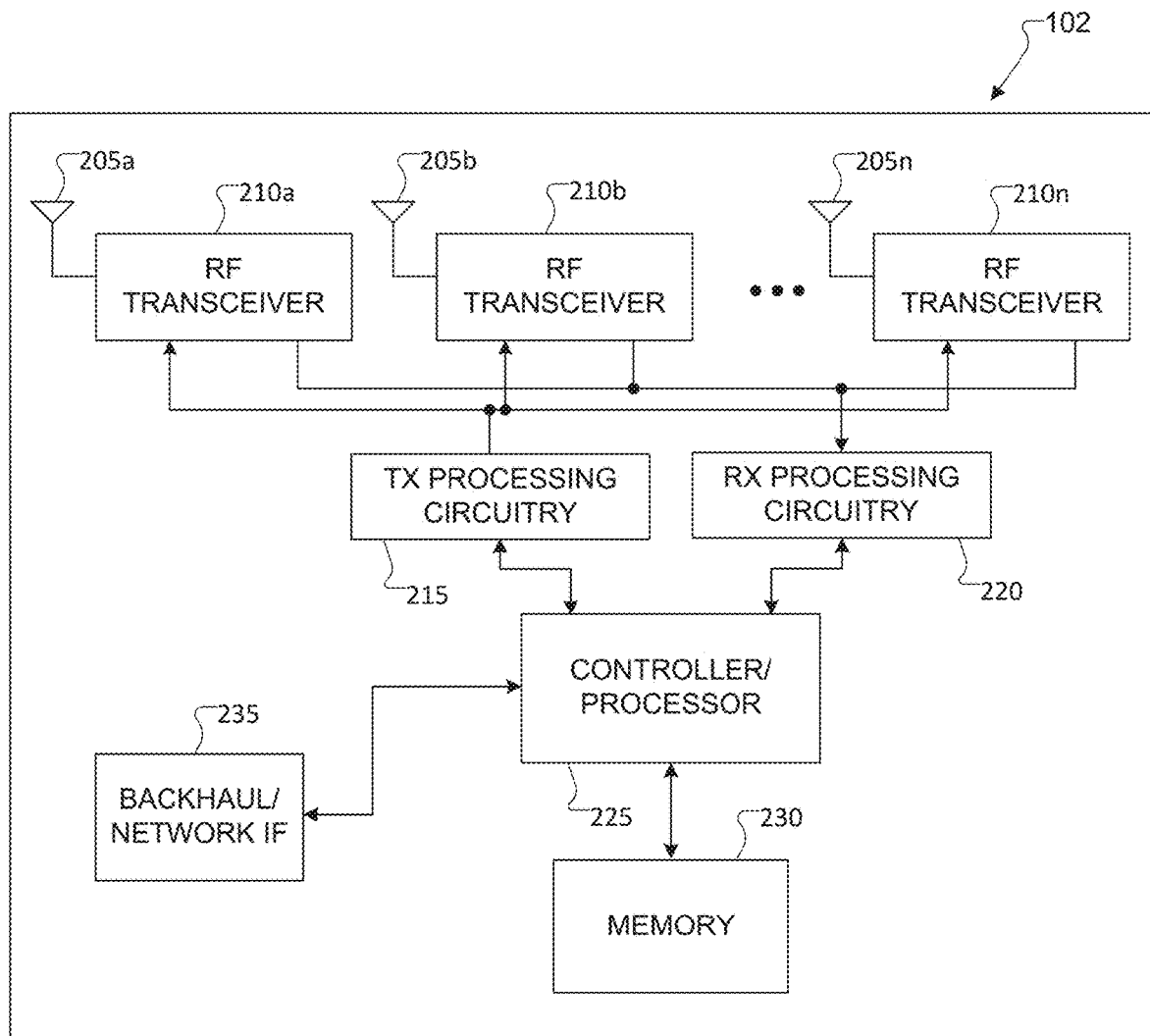
FIG. 2 illustrates an example gNB according to embodiments of the present disclosure.
Figure 3:
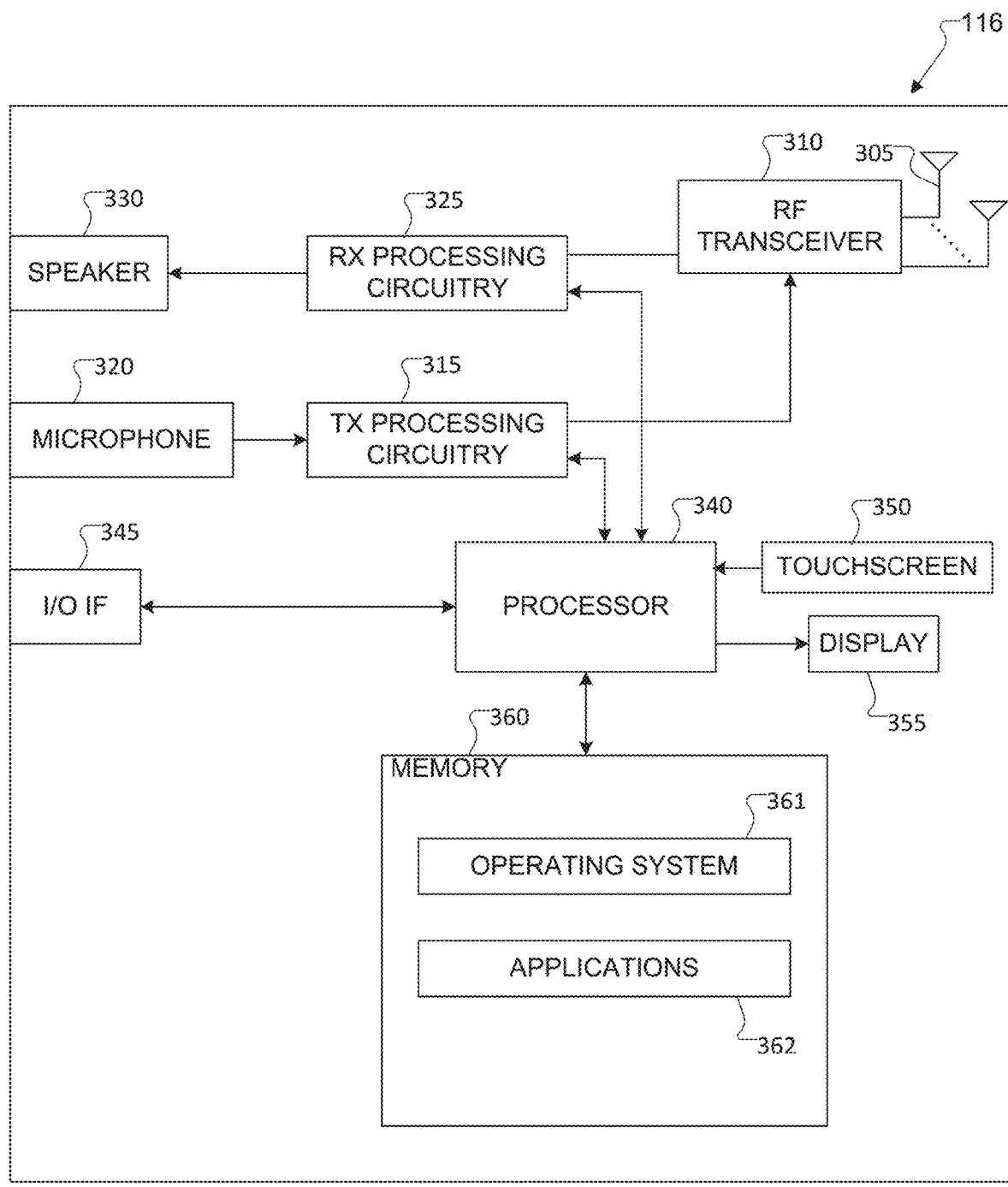
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for user selection in distributed MIMO. In certain embodiments, and one or more of the gNBs 101-103 includes circuitry, programing, or a combination thereof for user selection in distributed MIMO.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Furthermore, discussions on use cases and deployment scenarios for 5G NR systems operating beyond 52.6 GHz bands have already begun, and support for operation in these bands will be included in 3GPP Release 16. Following this trend, it is inevitable that telecommunications will utilize the terahertz (THz) bands for future wireless systems. Therefore, the 5G/NR or future 6G communication system will likely utilize a terahertz (THz) bands The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. The THz band is here defined as the frequencies ranging from 0.1 THz to 10 THz, which aligns with some publications such as. A total of 102 GHz spectrum in the range between 95 GHz and 300 GHz is being made accessible for licensed fixed point-to-point and mobile services through the Spectrum Horizon program. Accordingly, the extremely wideband THz channels with tens of GHz-wide bandwidth could potentially support the terabits per second (Tbps) communication envisioned by the future 6G standard. The present disclosure may also be applied to deployment of 5G communication system, 6G or even later release that may use THz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4A:
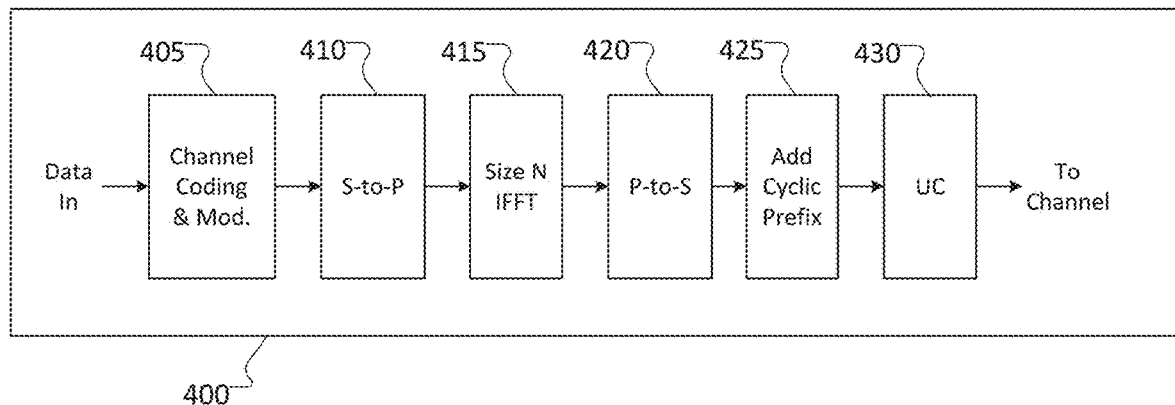
FIGS. 4A and 4B illustrate example wireless transmit and receive paths according to the present disclosure.
Figure 4B:
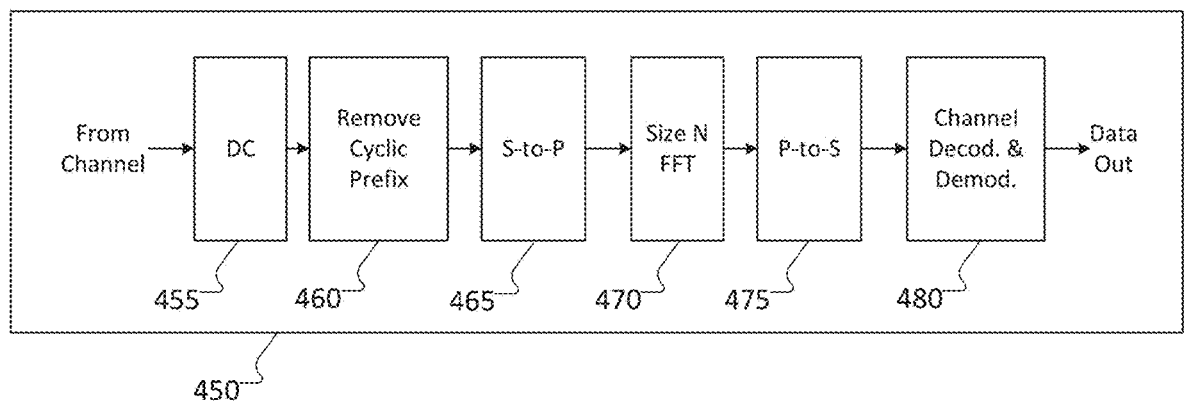

FIG. 4A and FIG. 4B illustrate example wireless transmit and receive paths according to this disclosure. In the following description, a transmit path 400 may be described as being implemented in a gNB (such as the gNB 102), while a receive path 450 may be described as being implemented in a UE (such as a UE 116). However, it may be understood that the receive path 450 can be implemented in a gNB and that the transmit path 400 can be implemented in a UE. In some embodiments, the receive path 450 is configured to support adapting a channel sensing threshold as described in embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 450 as illustrated in FIG. 4B includes a down-converter (DC) 455, a remove cyclic prefix block 460, a serial-to-parallel (S-to-P) block 465, a size N fast Fourier transform (FFT) block 470, a parallel-to-serial (P-to-S) block 475, and a channel decoding and demodulation block 485.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 485 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 450 for receiving in the downlink from the gNBs 101-103.

Each of the components in FIG. 4A and FIG. 4B can be implemented using only hardware or using a combination of hardware and software/firmware. As a particular example, at least some of the components in FIG. 4A and FIG. 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

This disclosure focuses on overall 140 GHz system; RF specifications; a baseband modem specification and design; and a system architecture and signal processing. Embodiments of the present discloser provide an antenna system and transceiver architecture that provide an end-to-end 140 gigahertz (GHz) fully digital beamformed system. Certain embodiments of the present disclosure provide a 144 GHz wireless link prototype capable of operating in lower THz bands for wireless communications. Embodiments of the present disclosure also provide a real-time link with adaptive beam steering, which further provide data-rate of 6.3 Gbps at 15-meter distance in a 2 GHz of bandwidth.

Figure 5:
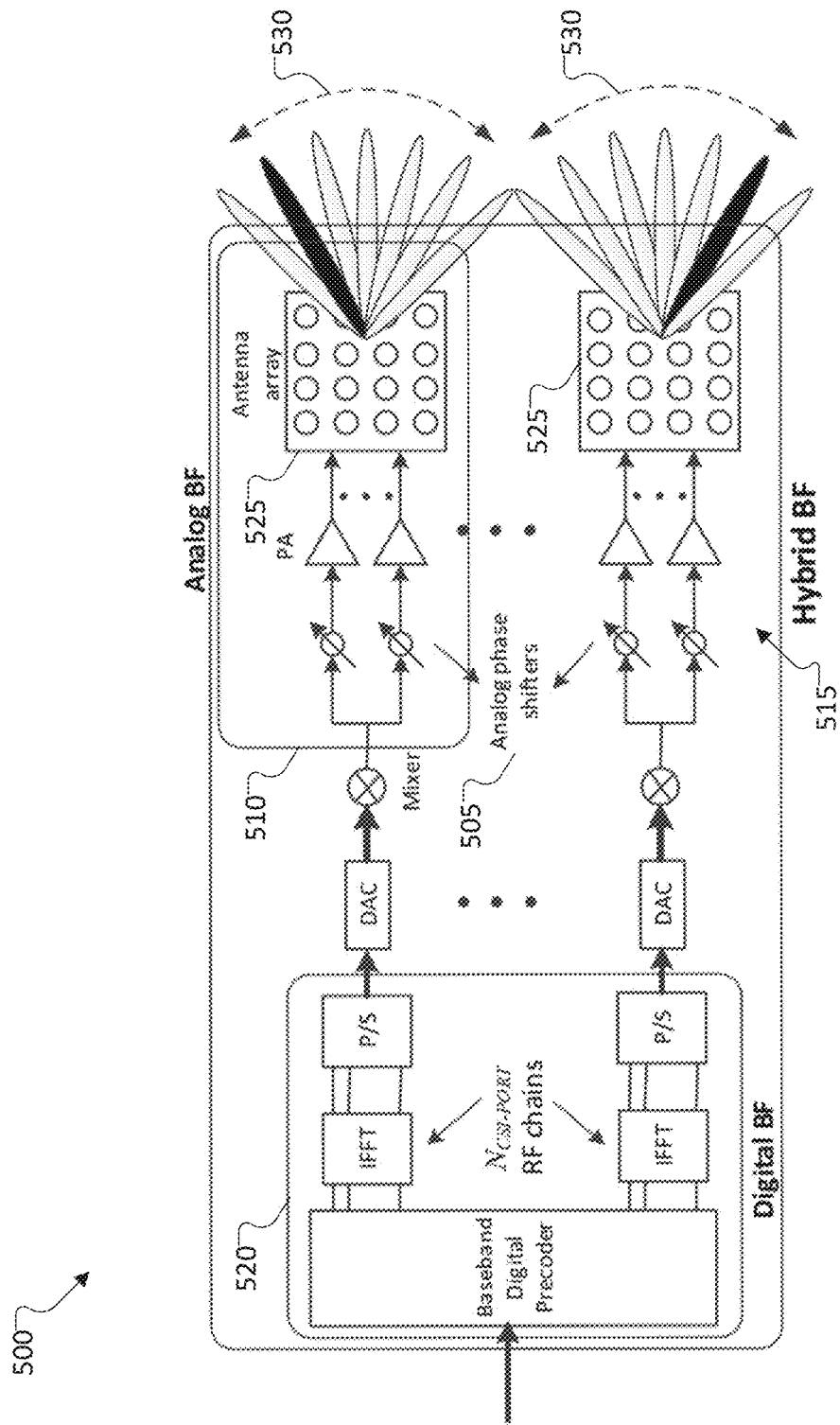
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Distributed multiple-input multiple-output (MIMO) is a technology that achieves MIMO communications by utilizing distributed antennas on multiple transmission and reception points (TRPs) forming a virtual antenna array. In coordinated multi-point (CoMP) transmission, distributed MIMO can be realized by grouping spatially distributed antennas from multiple transmission points (TRPs) in a CoMP set that are coordinated in downlink (DL) transmissions by a control unit based on the channel state information (CSI). Distributed MIMO provides the advantageous capability to enable a larger cell coverage and to improve throughput, especially in the cell edge.

One of the challenges occurred in distributed MIMO transmission is power imbalance among the received signals from different TRPs due to antenna main lobes pointing to different directions. Although users can benefit from distributed MIMO transmissions by exploiting spatial domain MIMO channels and multipath diversity, some other users suffering power imbalance can experience degraded rate when distributed MIMO is applied with limited feedback, which leads to impaired system performance. Thus, user selection for distributed MIMO transmission is critical to guarantee performance improvement. By user selection, distributed MIMO transmission is adopted only on the selected benefited users.

Figure 6A:
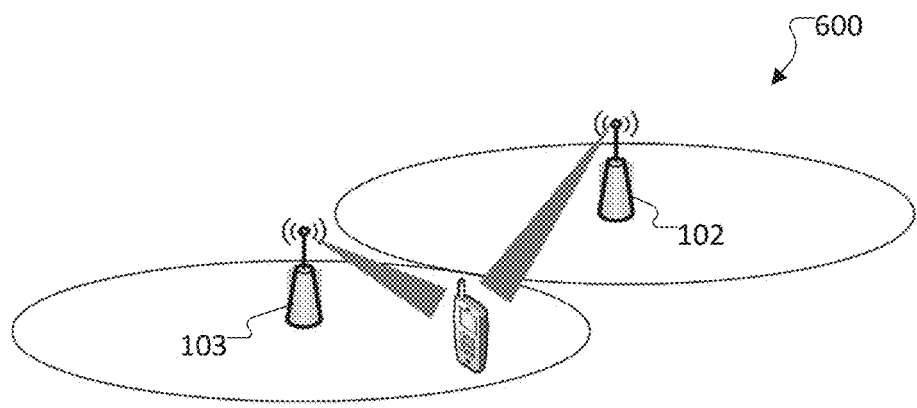
FIG. 6A illustrates distributed MIMO transmission to a selected user according to embodiments of the present disclosure.
Figure 6B:
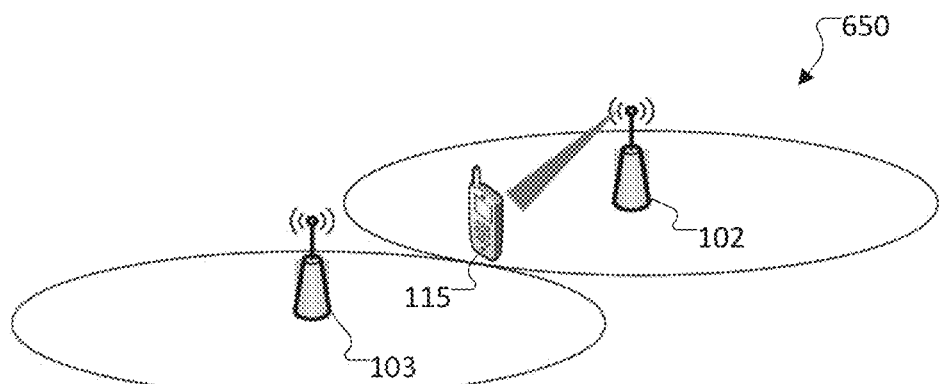
FIG. 6B illustrates a legacy transmission to an unselect user according to embodiments of the present disclosure.

FIG. 6A illustrates distributed MIMO transmission to a selected user according to embodiments of the present disclosure. FIG. 6B illustrates a legacy transmission to an unselect user according to embodiments of the present disclosure. The embodiments of MIMO and Legacy transmissions shown in FIGS. 6A and 6B are for illustration only. Other embodiments could be used without departing from the scope of the present disclosure.

In the distributed MIMO transmission 600, multiple TRPs, such as gNB 102 and a gNB 103, provide a communication to a selected user equipment, UE 116. That is, the serving TRP, gNB 102, and the helping TRP, gNB 103 transmit signals to the selected UE 116. Alternatively, in a legacy transmission 650 is communicated a serving TRP, namely gNB 102, to an associated user, such as UE 115, when it is not selected.

Figure 7:
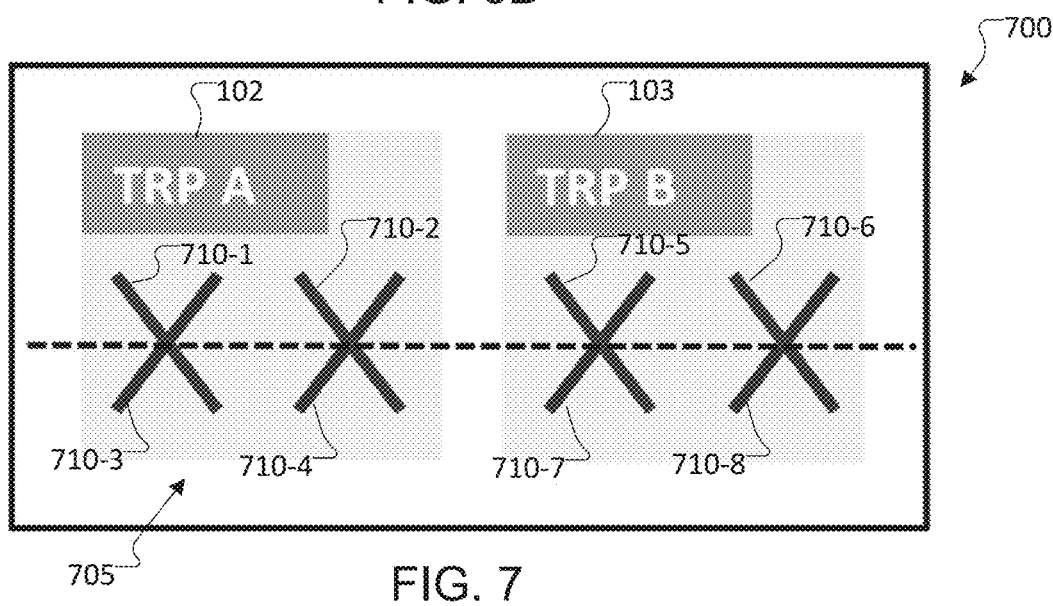
FIG. 7 shows an example of antenna port concatenation of multiple TRPs according to embodiments of the present disclosure.

FIG. 7 shows an example of antenna port concatenation of multiple TRPs according to embodiments of the present disclosure. The example of the antenna port concatenation shown in FIG. 7 is for illustration only. Other embodiments could be used without departing from the scope of the present disclosure.

The distributed antennas of multiple TRPs form a virtual antenna array 700. UE 116 can receive CSI-RS over a channel where antenna ports from multiple TRPs, namely gNB 102 and gNB 103, are concatenated, referring to the concatenated channel. Each TRP has an antenna panel with 2 X-pol antenna element pairs 705. Each X-pol element pair 705 comprises two antenna elements polarized into two directions, e.g., +45 degs and −45 degs. In this example, each antenna element maps to an antenna port. The concatenated antenna ports are indexed as 710-1, 710-2, 710-3, 710-4, 710-5, 710=6, 710-7, and 710-8.

Figure 8:
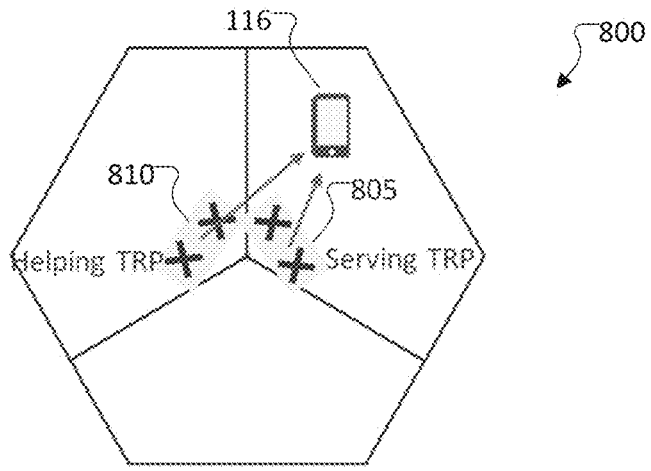
FIG. 8 illustrates a serving transmission point (TRP) and a helping TRP performing a distributed multiple input multiple output (MIMO) according to embodiments of the present disclosure.

FIG. 8 illustrates a serving transmission point (TRP) and a helping TRP performing a distributed multiple input multiple output (MIMO) according to embodiments of the present disclosure. The embodiment of the distributed MIMO 800 shown in FIG. 8 is for illustration only and other embodiments could be used without departing from the scope of the present disclosure.

Distributed MIMO can provide channels of larger dimension in spatial domain and higher multipath diversity, producing a theoretically higher throughput; but this cannot be realized with limited CSI feedback. When CSI report cannot reflect the concatenated channel from multi-TRPs, distributed MIMO beamforming based on the CSI report cannot incorporate the inter-panel effects, such as power imbalance, phase difference, and the like. For example, one challenge is power imbalance among the received signals from different TRPs due to antenna main lobes of different TRPs pointing to different directions. Users suffering these issues may not benefit from distributed MIMO transmissions. Thus, embodiments of the present disclosure provide that user selection methods are designed to perform distributed MIMO only on suitable users.

A base station (BS), such as gNB 102, can select a user, such as UE 116, for distributed MIMO based on its CSI of its concatenated channel, and/or its serving TRP 805 channel, and/or its helping TRP 810 channel, and/or other information implying the UE's performance indicator. A UE's 116 CSI can include Rank Indicator (RI), and/or Channel Quality Indicator (CQI), and/or Precoding Matrix Indicator (PMI), and/or Reference Signal Received Power (RSRP), and/or Reference Signal Received Quality (RSRQ). A UE's 116 performance indicators can include data rate, and/or block error rate (BLER), and/or code rate, and/or modulation order, and/or the number of retransmissions, which are functions of CSI. These quantities can be instantaneous values, and/or average values over time. The gNB 102 can also use the statistics of these quantities, such as the median and/or percentile values. UE 116 can be selected for distributed MIMO transmission based on CSI reports of one or multiple CSI-RS measurements. The CSI reports for single TRP channel and/or helping TRP and/or multi-TRP channel can imply if the UE 116 downlink channel is suitable for distributed MIMO transmission or not. For example, the RSRP of serving TRP 805 channel and helping TRP 810 channel can imply whether power imbalance exists for UE 116 received signals from two TRPs. Based on the reported quantities that characterizes CSI, such as RSRP, RI, and CQI, certain metrics, i.e., UE performance indicators, can be used to select user for distributed MIMO.

User Selection Method with Multiple CSI-RS Resource Sets

Figure 9:
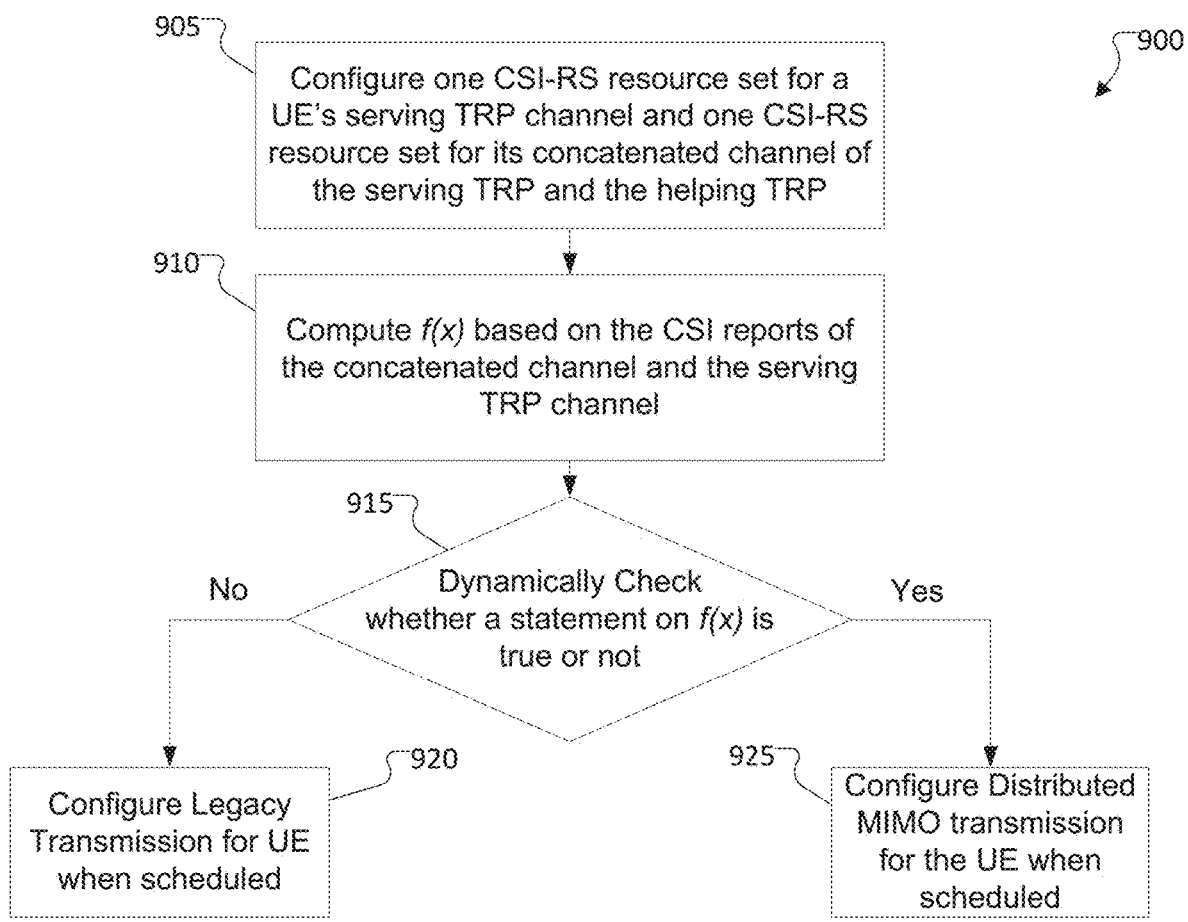
FIG. 9 illustrates a process for user selection with multiple CSI-RS resources configured according to embodiments of the present disclosure.

FIG. 9 illustrates a process for user selection with multiple CSI-RS resources configured according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

In one method, user selection is determined with two CSI-RS resource sets configured, including one resource set for its concatenated channel from the serving and help TRP and the other resource set for its serving TRP channel. For example, in 5G NR, multiple CSI resource sets can be configured according to 3GPP, TR 38.331 v16.1.0, Radio Resource Control (RRC); Protocol specification, where different TRPs can be configured with different CSI resource sets, and two TRPs can be configured in one CSI resource set over different antenna ports.

At operation 905, gNB 102 configures one CSI-RS resource set for a UE's 116 serving TRP channel and another CSI-RS resource set for its concatenated channel of the serving TRP and the helping TRP. At operation 910, gNB 102 computes a metric that is a function of the quantities included in CSI reports of the UE's concatenated channel and its serving TRP channel, denoted $f(x_1, x_2, \ldots, x_k, y_1, y_2, \ldots, y_k, \ldots)$, where $x_k$ and $y_k$ denote the k-th quantity of the concatenated channel and the serving TRP channel, respectively, that are obtained from CSI-RS feedback reports and/or other channel quality indicators. At operation 915, gNB 102 checks dynamically whether a statement on $f(x_1, x_2, \ldots, x_k, \ldots, y_1, y_2, \ldots, y_k, \ldots)$ is true or not based on the periodicity of the CSI reports. If the statement is false, at operation 920, gNB 102 configures legacy transmission for the UE 116 whenever it is scheduled. If the statement is true, at operation 925, gNB 102 configures distributed MIMO transmission for the UE 116 when it is scheduled. For example, in 5G NR, distributed MIMO transmission by multi-TRPs can be configured via single-DCI or multi-DCI (Downlink Control Indicator) such as in 3GPP, TR 38.331 v16.1.0, Radio Resource Control (RRC); Protocol specification.

As examples of operations 910 and 915, metric $f(x_1, x_2, \ldots, x_k, \ldots, y_1, y_2, \ldots, y_k, \ldots)$ and the corresponding statement can be the UE's serving TRP RSRP>$p_1$, and/or the UE's RSRP difference between the serving TRP 805 and the helping TRP 810<$p_2$, and/or the UE's RSRQ difference between the serving TRP 805 and the helping TRP 810<$p_3$, and/or average RI difference between the CSI-RS feedback on the concatenated channel and the CSI-RS feedback on the serving TRP 805 channel>$I_1$, and/or average CQI difference between the CSI-RS feedback on the concatenated channel and the CSI-RS feedback on the serving TRP 805 channel>$I_2$, and/or average estimate rate difference between the concatenated channel and the serving TRP 805 channel>$R_1$, where the instantaneous estimated rate can be calculated by $RI*\log_2(1+B*CQI)$, where B denotes a parameter determined in the outer loop error rate. The thresholds, $p_1, p_2, p_3, I_1, I_2$, and $R_1$ can be predefined or configurable. Alternatives to the average value are median and/or percentile values.

Figure 10:
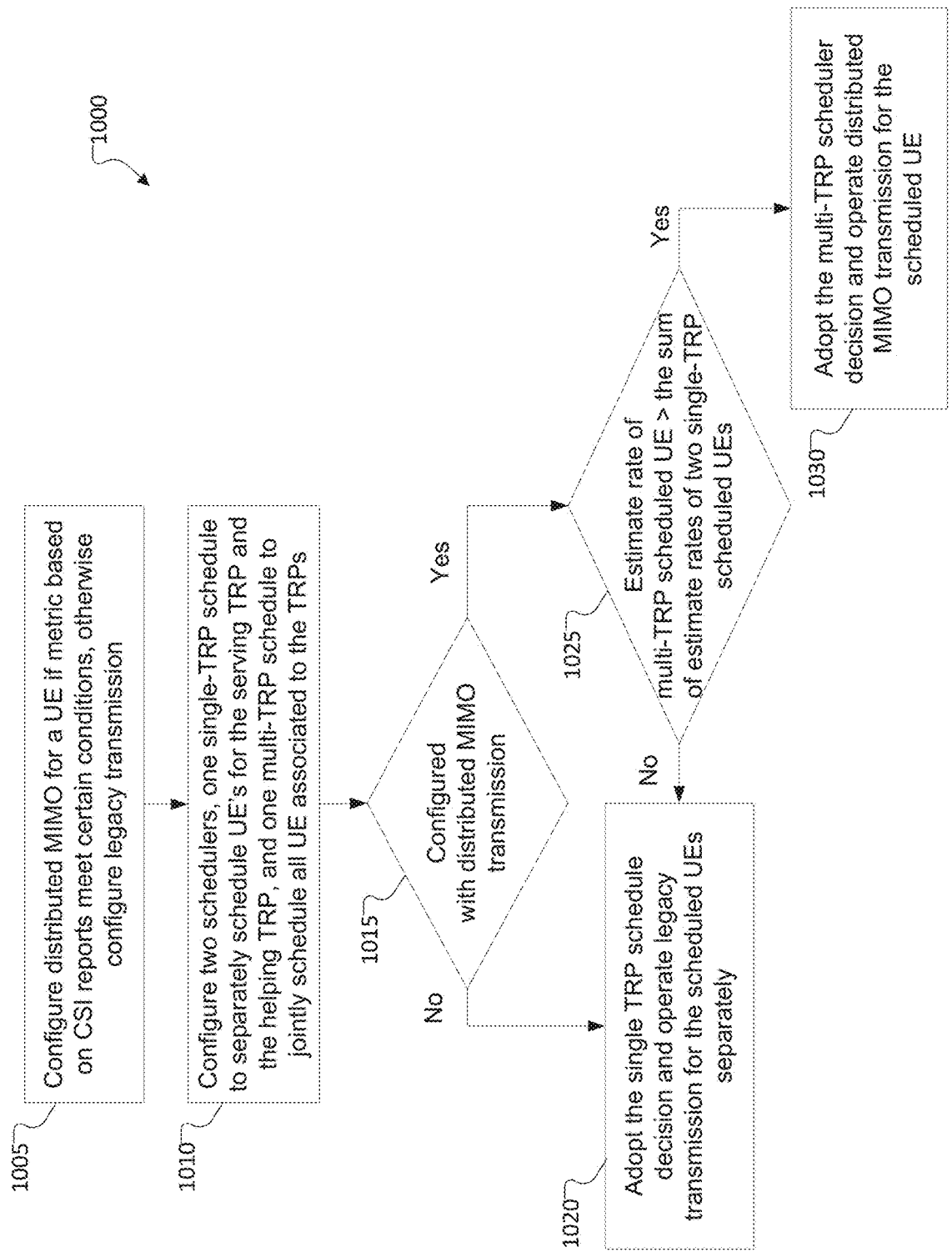
FIG. 10 illustrates a process for user selection combined with scheduling according to embodiments of the present disclosure.

FIG. 10 illustrates a process for user selection combined with scheduling according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

In operation 1005, gNB 102 configures distributed MIMO for a UE if a metric based on CSI reports meet certain conditions, otherwise gNB 102 configures for legacy UE transmission. The conditions can be predefined based on a threshold of CSI values or channel quality indicators or reference signal received power (RSRP). Operation 1005 can include the same operations of process 900, namely operation s 905, 910, 915, 920, and 925. At operation 1010, gNB 012 configures two schedulers, i.e., one single-TRP scheduler to separately schedule UE 116 for the serving TRP 805 and the helping TRP 810, and one multi-TRP scheduler to jointly schedule all UEs, such as UE 115 and UE 116, associated with the TRPs. At operation 1015, gNB 102 checks whether the scheduled UE 116 of the multi-TRP scheduler is selected for distributed MIMO transmission. If not, at operation 1020, gNB 102 adopts the single TRP scheduler decision and operates legacy transmission for the scheduled UEs separately. If yes, at operation 1025, gNB 102 checks if the estimate rate of multi-TRP scheduled UE 116 is larger than the sum of estimate rates of two single-TRP scheduled UEs. If the estimate is not larger in operation 1025, gNB 102 performs operation 1020. If the estimate is larger in operation 1025, at operation 1030, gNB 102 adopts the multi-TRP scheduler decision and operates distributed MIMO transmission for the scheduled UE.

User Selection Method with One CSI-RS Feedback Resource Set

Figure 11:
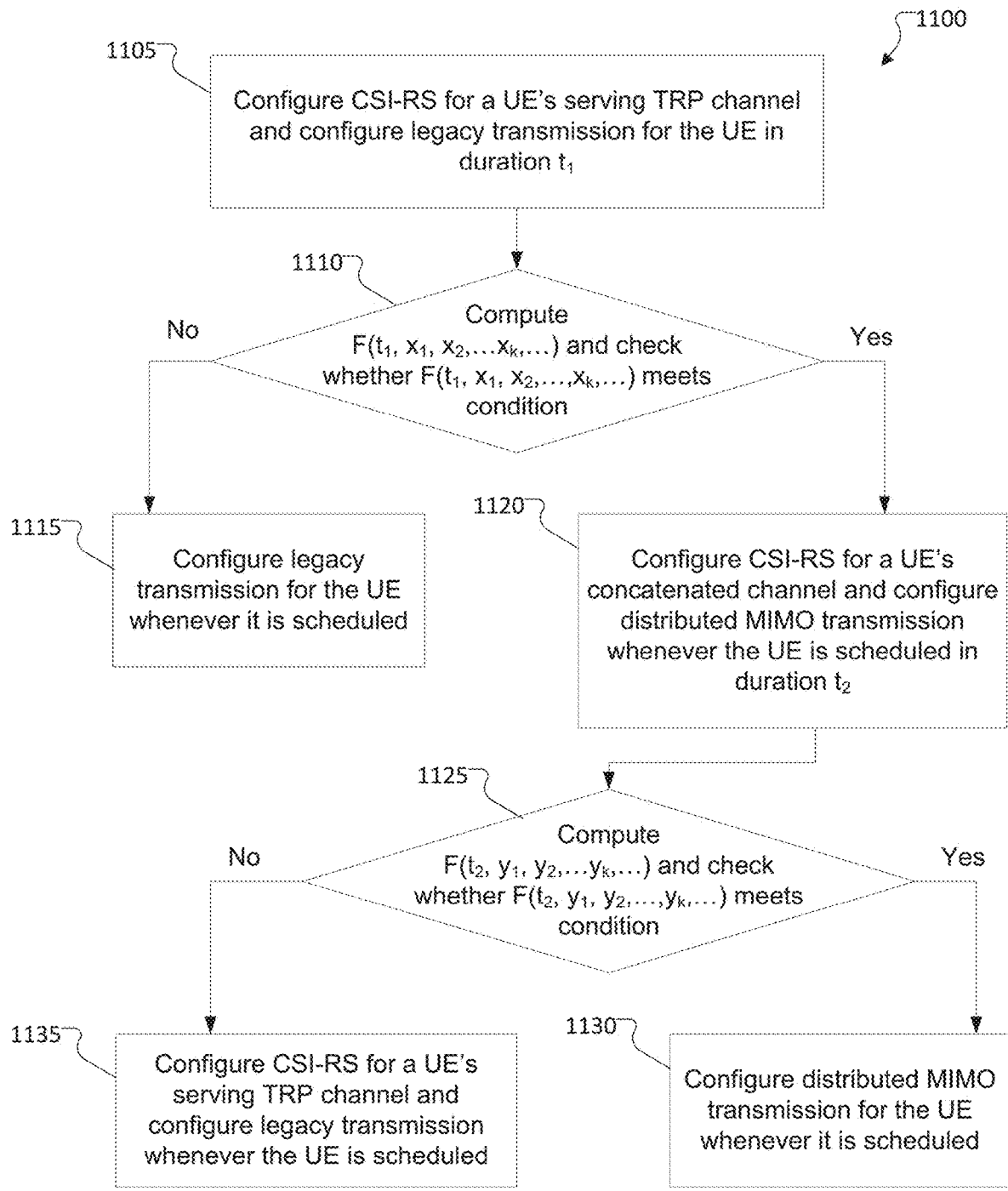
FIG. 11 illustrates a process for user selection based on a multi-shot decision with one CSI-RS resource set configured according to embodiments of the present disclosure.

FIG. 11 illustrates a process for user selection based on a multi-shot decision with one CSI-RS resource set configured according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

In certain embodiments, a user is selected for distributed MIMO transmission with one CSI-RS resource set configured. The single CSI-RS resource set is either for the channel from a user's associated serving TRP or for the concatenated channel from the multiple TRPs, including the user's serving TRP and other helping TRPs. In the process 1100 for user selection based on a multi-shot decision with one CSI-RS resource set configured, at operation 1105, gNB 102 configures a CSI-RS resource set for a UE's 116 serving TRP channel and configures legacy transmission for the UE 116 for a configured or predefined duration $t_1$. At operation 1110, gNB 102 computes a metric that is a function of $t_1$ and the channel quality of the UE's 116 serving TRP channel, denoted $F(t_1, x_1, x_2, \ldots, x_k, \ldots)$, where $x_k$ denotes the k-th quantity of the serving TRP channel, and checks whether $F(t_1, x_1, x_2, \ldots, x_k, \ldots)$ meets certain conditions. If the condition is not met, the process 1100 proceeds to operation 1115 in which UE 116 remains for legacy transmission. The gNB 102 configures legacy transmission for the UE 116 whenever it is scheduled based on the CSI-RS feedback of its serving TRP channel. If the condition is met in operation 1110, at operation 1120, gNB 102 configures a CSI-RS resource set for the UE's 116 concatenated channel and configures distributed MIMO transmission when the UE 116 is scheduled in the next duration $t_2$, which is predefined or configured. At operation 1125, gNB 102 computes $F(t_2, y_1, y_2, \ldots, y_k, \ldots)$ as a function of $t_2$ and the channel quality of the UE's concatenated channel, where $y_k$ denotes the k-th quantity of the concatenated channel. The BS checks whether $F(t_2, y_1, y_2, \ldots, y_k, \ldots)$ meet certain conditions. If the condition is met in operation 1125, at operation 1130, UE 116 is selected for distributed MIMO transmission and gNB 102 configures distributed MIMO transmission for the UE whenever it is scheduled. Otherwise if the condition is not met in operation 1125, at operation 1135, gNB 102 configures CSI-RS resource set for the UE's serving TRP channel and configures legacy transmission whenever the UE is scheduled.

Examples of $F(t_1, x_1, x_2, \ldots, x_k, \ldots)$ and associated condition at operation 1110 can be RSRP difference of the serving TRP and the helping TRP<$Thred_1$, and/or serving TRP RSRP>$Thred_2$, and/or average RI, and/or average CQI, and/or average estimate rate>$Thred_3$. $F(t_2, y_1, y_2, \ldots, y_k, \ldots)$ is the same metric corresponding to the concatenated channel.

User Selection Method with Multiple CSI-RS Feedback Resource Sets

In certain embodiments of process 900 or process 1000, or both, UE 116 is selected for distributed MIMO transmission with three CSI-RS feedback resource sets configured. For example, at operation 905 or operation 1005, or both, gNB 102 configures one resource set for a UE's concatenated channel from its serving TRP 805 and helping TRP 810, one resource set for its serving TRP channel with the helping TRP 810 configured with zero power CSI-RS (ZP-CSI-RS), and one resource set for the helping TRP channel with the serving TRP 805 configured with ZP-CSI-RS. At operation 910, or operation 1010, or both, gNB 102 computes a metric that is a function of the channel quality of the UE's 116 concatenated channel, the serving TRP channel, and the helping TRP channel, denoted $g(x_1, x_2, \ldots, x_k, \ldots, y_1, y_2, \ldots, y_k, \ldots, z_1, z_2, \ldots, z_k, \ldots)$, where $x_k$, $y_k$, and $z_k$ denote the k-th quantity of the concatenated channel, the serving TRP channel, and the helping TRP channel, respectively. At operation 915, or operation 1015, or both, gNB 102 checks periodically whether a statement on $g(x_1, x_2, \ldots, x_k, \ldots, y_2, \ldots, y_k, \ldots, z_1, z_2, \ldots, z_k, \ldots)$ is true. An alternative statement besides the examples mentioned above, gNB 102 can check whether the average CQI difference between the serving TRP channel and the helping TRP channel is smaller than a configured or a predefined threshold.

User Selection Method with One CSI-RS Feedback Resource Set

Figure 12:
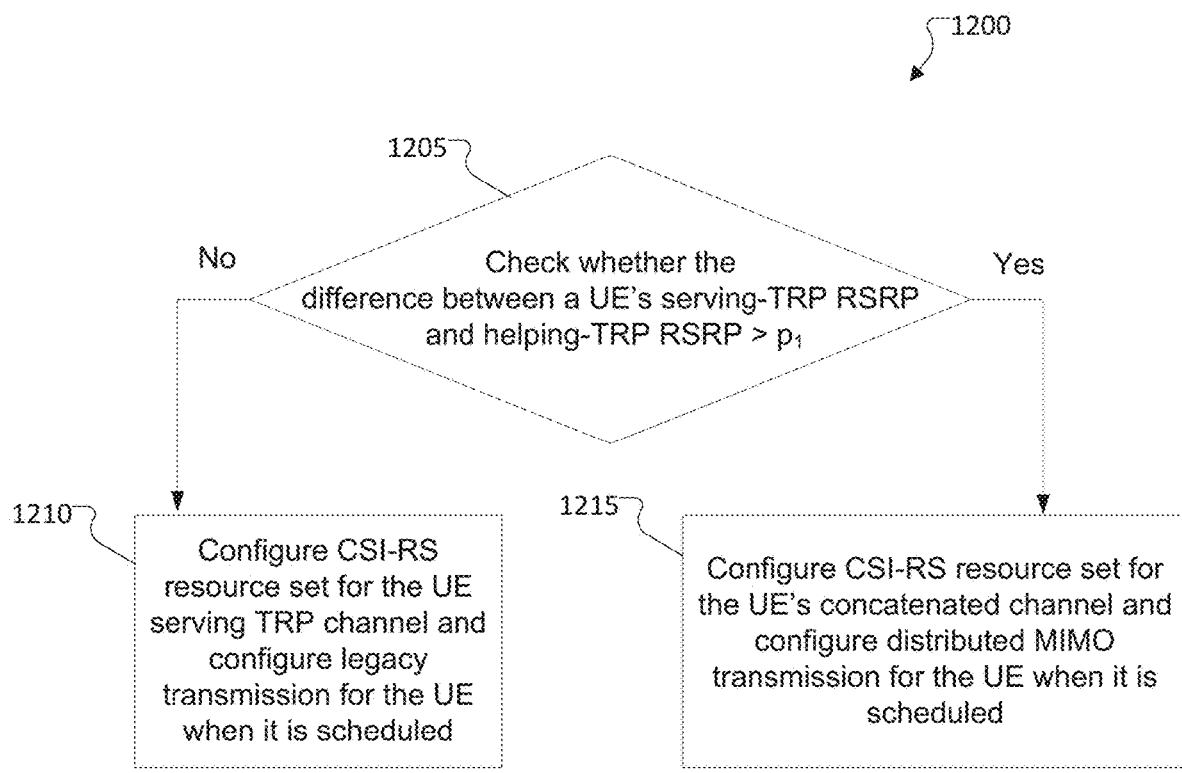
FIG. 12 illustrates a process for user selection based on a single-shot decision with one CSI-RS resource set configured according to embodiments of the present disclosure.

FIG. 12 illustrates a process for user selection based on a single-shot decision with one CSI-RS resource set configured according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

In the process 1200, at operation 1205, the BS checks the RSRP difference between the UE's serving TRP and helping TRP. If the RSRP difference is larger than a predefined or configured threshold $p_1$, UE 116 remains for legacy transmission. At operation 1210, gNB 102 configures CSI-RS resource set for the UE's 116 serving TRP channel and configures legacy transmission for UE 116 when it is scheduled. Otherwise, UE 116 is selected for distributed MIMO transmission. At operation 1215, gNB 102 configures CSI-RS resource set for the UE's concatenated channel and configures distributed MIMO transmission for UE 116 when it is scheduled.

In certain embodiments, in an alternative to operation 1205, gNB 102 checks whether the UE's 116 serving TRP RSRP is larger than a threshed $p_1$, and whether the RSRP difference between the serving TRP 805 and the heling TRP 810 is smaller than a threshold $p_2$, where $p_1$ and $p_2$ are predefined or configured. If both conditions are satisfied, gNB 102 performs operation 1215. Otherwise, gNB 102 performs operation 1210.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
    a transceiver configured to communicate via a wired or wireless communication medium; and
    a processor operably coupled to the transceiver and configured to:
        configure a first channel state information-reference signal (CSI-RS) resource set for a serving transmission point (TRP) and a second CSI-RS resource for a concatenated channel, wherein the concatenated channel is established between a virtual panel and a user equipment (UE), the virtual panel comprising distributed panels of the serving TRP and a helping TRP;
        compute a metric as a function of one or more quantities included in one or more measurement reports, received from the UE, for the concatenated channel and at least one channel of the serving TRP or the helping TRP; and
        configure, based on the metric, a legacy transmission or a distributed multiple input multiple output (MIMO) transmission for the UE.

2. The apparatus of claim 1, wherein the processor is further configured to configure a third CSI-RS resource set to assist the helping TRP.

3. The apparatus of claim 1, wherein the processor is further configured to:
    configure, for the UE, at least one of two schedulers to schedule respective TRPs, the two schedulers comprising:
        a single TRP scheduler configured to schedule the UE for the legacy transmission using a single TRP for a downlink transmission; and a multi-TRP scheduler configured to schedule the UE for a distributed MIMO transmission using the serving TRP and the helping TRP simultaneously for the downlink transmission.

4. The apparatus of claim 3, wherein the processor is further configured to, based on a determination that at least one of the two schedulers is configured with the distributed MIMO transmission:
adopt a single TRP scheduler decision and perform the legacy transmission for scheduled UEs separately; or
determine whether an estimation rate of a multi-TRP scheduled UE is larger than a sum of estimation rates of two single-TRP scheduled UEs.

5. The apparatus of claim 3, wherein the processor is further configured to, based on a determination whether an estimation rate of the multi-TRP scheduler is larger than a sum of estimation rates of two single TRP schedulers:
adopt a single TRP scheduler decision and perform the legacy transmission for scheduled UEs separately; or
adopt a multi-TRP scheduler decision and perform the distributed MIMO transmission for the UE.

6. The apparatus of claim 1, wherein the processor is further configured to configure the UE for a respective duration and, based on a comparison of the metric and one or more preset conditions for each time duration:
configure the UE for the legacy transmission at a first duration and, if the metric satisfies a first condition for the first duration, the UE is configured for a distributed MIMO transmission for a second duration, and if the metric does not satisfy the first condition, the UE is configured for the legacy transmission continuously;
configure the UE for the distributed MIMO transmission for the second duration, and if the metric satisfies a second condition, the UE is configured to remain for the distributed MIMO transmission, and if the metric does not satisfy the second condition, the UE is configured for the legacy transmission; or
at each duration, configure the UE for the legacy transmission or configure the UE for the distributed MIMO transmission.

7. The apparatus of claim 1, wherein the metric comprises, for a predefined duration, a function of a channel quality of the serving TRP or the helping TRP.

8. The apparatus of claim 1, wherein the one or more quantities comprise one or more of: a threshold of quantities indicating CSI values including channel quality indicators, a reference signal received power (RSRP), ranking indicators, or an estimation rate.

9. A method comprising:
configuring a first channel state information-reference signal (CSI-RS) resource set for a serving transmission point (TRP) and a second CSI-RS resource for a concatenated channel, wherein the concatenated channel is established between a virtual panel and a user equipment (UE), the virtual panel comprising distributed panels of the serving TRP and a helping TRP;
computing a metric as a function of one or more quantities included in one or more measurement reports, received from the UE, for the concatenated channel and at least one channel of the serving TRP or the helping TRP; and
configuring, based on the metric, a legacy transmission or a distributed multiple input multiple output (MIMO) transmission for the UE.

10. The method of claim 9, further comprising configuring a third CSI-RS resource set to assist the helping TRP.

11. The method of claim 9, further comprising:
configuring, for the UE, at least one of two schedulers to schedule respective TRPs, the two schedulers comprising:
a single TRP scheduler configured to schedule the UE for the legacy transmission using a single TRP for a downlink transmission; and
a multi-TRP scheduler configured to schedule the UE for a distributed MIMO transmission using the serving TRP and the helping TRP simultaneously for the downlink transmission.

12. The method of claim 11, further comprising, based on a determination that at least one of the two schedulers is configured with the distributed MIMO transmission:
adopting a single TRP scheduler decision and performing the legacy transmission for scheduled UEs separately; or
determining whether an estimation rate of a multi-TRP scheduled UE is larger than a sum of estimation rates of two single-TRP scheduled UEs.

13. The method of claim 11, further comprising, based on a determination whether an estimation rate of the multi-TRP scheduler is larger than a sum of estimation rates of two single TRP schedulers:
adopting a single TRP scheduler decision and performing the legacy transmission for scheduled UEs separately; or
adopting a multi-TRP scheduler decision and performing the distributed MIMO transmission for the UE.

14. The method of claim 9, further comprising configuring the UE for a respective duration and, based on a comparison of the metric and one or more preset conditions for each time duration:
configuring the UE for the legacy transmission at a first duration and, if the metric satisfies a first condition for the first duration, the UE is configured for a distributed MIMO transmission for a second duration, and if the metric does not satisfy the first condition, the UE is configured for the legacy transmission continuously;
configuring the UE for the distributed MIMO transmission for the second duration, and if the metric satisfies a second condition, the UE is configured to remain for the distributed MIMO transmission, and if the metric does not satisfy the second condition, the UE is configured for the legacy transmission; or
at each duration, configuring the UE for the legacy transmission or configuring the UE for the distributed MIMO transmission.

15. The method of claim 9, wherein the metric comprises, for a predefined duration, a function of a channel quality of the serving TRP or the helping TRP.

16. The method of claim 9, wherein the one or more quantities comprise one or more of: a threshold of quantities indicating CSI values including channel quality indicators, a reference signal received power (RSRP), ranking indicators, or an estimation rate.

17. A non-transitory computer readable medium comprising a plurality of instructions that, when executed by at least one processor, cause the at least one processor to:
configure a first channel state information-reference signal (CSI-RS) resource set for a serving transmission point (TRP) and a second CSI-RS resource for a concatenated channel, wherein the concatenated channel is established between a virtual panel and a user equipment (UE), the virtual panel comprising distributed panels of the serving TRP and a helping TRP;

compute a metric as a function of one or more quantities included in one or more measurement reports, received from the UE, for the concatenated channel and at least one channel of the serving TRP or the helping TRP; and
configure, based on the metric, a legacy transmission or a distributed multiple input multiple output (MIMO) transmission for the UE.

18. The non-transitory computer readable medium of claim 17, wherein the at least one processor is further configured to configure a third CSI-RS resource set to assist the helping TRP.

19. The non-transitory computer readable medium of claim 17, wherein the at least one processor is further configured to:
 configure, for the UE, at least one of two schedulers to schedule respective TRPs, the two schedulers comprising:
  a single TRP scheduler configured to schedule the UE for the legacy transmission using a single TRP for a downlink transmission; and
  a multi-TRP scheduler configured to schedule the UE for the distributed MIMO transmission using the serving TRP and the helping TRP simultaneously for the downlink transmission; and
 perform:
  based on a determination that at least one of the two schedulers is configured with a distributed MIMO transmission one of:
   adopting a single TRP scheduler decision and performing the legacy transmission for scheduled UEs separately; or determining whether an estimation rate of a multi-TRP scheduled UE is larger than a sum of estimate rates of two single-TRP scheduled UEs; or
  based on the determination whether the estimation rate of the multi-TRP scheduler is larger than the sum of estimation rates of two single-TRP schedulers:
   adopting the single TRP scheduler decision and performing the legacy transmission for scheduled UEs separately; or adopting a multi-TRP scheduler decision and performing the distributed MIMO transmission for the UE.

20. The non-transitory computer readable medium of claim 17, wherein the at least one processor is further configured to configure the UE for a respective duration and, based on a comparison of the metric and one or more preset conditions for each time duration:
 configure the UE for the legacy transmission at a first duration and, if the metric satisfies a first condition for the first duration, the UE is configured for the distributed MIMO transmission for a second duration, and if the metric does not satisfy the first condition, the UE is configured for the legacy transmission continuously;
 configure the UE for the distributed MIMO transmission for the second duration, and if the metric satisfies a second condition, the UE is configured to remain for the distributed MIMO transmission, and if the metric does not satisfy the second condition, the UE is configured for the legacy transmission; or
 at each duration, configure the UE for the legacy transmission or configure the UE for the distributed MIMO transmission.

* * * * *